United States Patent

Makhlouf et al.

[15] 3,666,710

[45] May 30, 1972

[54] NON-AQUEOUS DISPERSIONS

[72] Inventors: Joseph M. Makhlouf, Mars; Roger M. Christenson, Gibsonia; Andrew Halcoussis, Pittsburgh, all of Pa.

[73] Assignee: PPG Industries, Inc., Pittsburgh, Pa.

[22] Filed: Sept. 8, 1969

[21] Appl. No.: 856,173

[52] U.S. Cl............260/33.6 UA, 260/33.6 PQ, 260/33.6 R, 260/34.2
[51] Int. Cl....................C08f 45/28, C08f 47/20, C08j 1/46
[58] Field of Search...................260/33.6 PQ, 33.6 UA, 34.2

[56] References Cited

UNITED STATES PATENTS

| 3,317,635 | 5/1967 | Osmond................................260/34.2 |
| 3,325,443 | 6/1967 | Christenson et al. ..................260/34.2 |
| 3,514,500 | 5/1970 | Osmond et al.........................260/34.2 |

FOREIGN PATENTS OR APPLICATIONS

| 1,478,438 | 3/1967 | France..................................260/34.2 |

*Primary Examiner*—Allan Lieberman
*Attorney*—Chisholm and Spencer

[57] ABSTRACT

A non-aqueous dispersion of polymer particles is formed by polymerizing at least one ethylenically unsaturated monomer in a dispersing liquid in the presence of a polymerizable ethylenically unsaturated carboxylic acid, an imine, and a dispersion stabilizer which is a branched copolymer having two types of polymeric components of which one type is solvated by the dispersing liquid and the other type is an anchor polymer of different polarity to the first type and being relatively non-solvatable by the dispersing liquid and being capable of being anchored to the polymerized particles of the ethylenically unsaturated monomer and said anchor polymer containing pendant groups capable of copolymerizing with ethylenically unsaturated monomers. The resulting dispersion is stable where large amounts of active or coalescing solvents are added and a coating formed from the dispersion has excellent adhesion to many substrates.

10 Claims, No Drawings

NON-AQUEOUS DISPERSIONS

There are many fields in which it is desirous to use acrylic polymer topcoats for purposes of protection and for aesthetic reasons. In order to achieve a high solids coating composition of acrylic polymer, the acrylic monomer used to form the polymer can be polymerized in a non-aqueous dispersion in aliphatic hydrocarbon liquid using a stabilizer comprising a polymeric component which is solvatable by the aliphatic hydrocarbon and a component which is relatively non-solvated by the aliphatic hydrocarbon and is associated with the dispersed polymer particles. The acrylic monomer is soluble in the aliphatic hydrocarbon but the acrylic polymer formed is insoluble in the aliphatic hydrocarbon. The polymeric dispersion may then be coated onto the substrate in any conventional manner, preferably by thinning with a solvent thinner and spraying.

Some of the major problems involved with the use of acrylic dispersions as topcoat materials have been in the area of adhesion of the acrylic dispersion to surfaces to be coated and the propensity of the acrylic dispersions to be unstable upon dilution with coalescing solvents. The result of these problems has been a search for an acrylic dispersion which will adhere well to most surfaces and will also be capable of tolerating high levels of coalescing solvents without destabilization or gellation.

It has now been found that an acrylic dispersion comprising a polymerizable acrylic monomer, a polymerizable ethylenically unsaturated carboxylic acid, an imine, a dispersing liquid, and a dispersion stabilizer comprising a branched copolymer having two types of polymeric segments of which one segment is solvated by the dispersing liquid and non-associated with polymerized particles of the polymerizable monomer, and the other segment is an anchor polymer of different polarity to the first segment and being relatively non-solvatable by the dispersing liquid and associated with polymerized particles of the polymerizable monomer and said anchor polymer contains ethylenic unsaturation capable of copolymerizing with ethylenically unsaturated monomers, may be polymerized to form the polymeric acrylic dispersion which may then be coated on to various substrates. The resulting coating formed from the dispersions is adherent to primers and to many unprimed surfaces and the dispersion itself is extremely stable to the addition of high levels of thinning solvent.

In general, the process for making dispersions of acrylic polymers in organic solvents is by dispersion polymerizing acrylic monomer in an organic liquid in which it is soluble, but in which the resulting polymer is insoluble and forms disperse polymer particles. The reaction is carried out in the presence of a stabilizer having in its molecule (i) a constituent which becomes associated with the disperse polymer particles and (ii) a constituent having a pendant chain-like structure which is solvated by the organic liquid and provides a stabilizing sheath around the polymer particles.

By "acrylic polymer" is meant a polymer of an ester or amide of acrylic or methacrylic acid or a copolymer of such an ester with another copolymerizable monomer. Suitable esters include those of alcohols containing one to eight carbon atoms, such as methyl acrylate, methyl methacrylate, ethyl acrylate, n-butyl methacrylate, octyl acrylate and 2-ethoxyethyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, e.g., itaconate esters, maleate esters and allyl compounds. The preferable acrylic polymers in this invention are the alkyl methacrylates and, more specifically, poly(methyl methacrylate) and copolymers of methyl methacrylate and 2-ethyl hexyl acrylate.

The polymerization is effected in a dispersing liquid which is primarily a hydrocarbon medium consisting essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° C. up to about 235° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° C. to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° C. to 300° C.

When the polymerization is complete, the acrylic polymer dispersion may be thinned with an organic solvent thinner composition and sprayed on to the surface to be coated. The solvent thinner generally is comprised of two components, one component is an active solvent for the acrylic polymer, which is generally art recognized as a coalescing solvent, and the second component is a liquid aliphatic hydrocarbon. Some examples of the active solvent are ethoxyethyl acetate (Cellosolve acetate), 2,2,4-trimethyl-1,3-pentanediol monoisobutyrate, acetone, toluene, methyl ethyl ketone, methyl isobutyl ketone, methyl isoamyl ketone, and the like.

Some examples of liquid aliphatic hydrocarbons useful in the thinning solvents are hexane, heptane, octane, nonane, pentane, and the like.

The final paint composition usually comprises the acrylic polymer dispersion, the thinning solvent, and chemical plasticizers as carriers for the dispersion polymer particles and pigments, if desired. The chemical plasticizers may be any of the conventional plasticizers which are generally medium molecular weight esters and are not highly volatile and are materials in which acrylic polymers are soluble. Examples of plasticizers which may be used are phthalates, such as dibutyl phthalate, diisooctyl phthalate, decyl butyl phthalate; adipates such as diisooctyl adipate and dioctyl adipate; sebacates such as dibutyl sebacate and dioctyl sebacate; benzoates such as butyl benzoate, trimellitates such as triisooctyl trimellitate, n-octyl n-decyl trimellitate and others such as tricresyl phosphate, and the like. A more comprehensive discussion of the chemical plasticizers described herein may be found in Organic Coating Technology, Vol. 1, by Payne, in pages 389–391.

The relative amounts of plasticizer and pigment dispersion may be varied over a broad range. Generally, the plasticized acrylic polymer dispersion contains up to about 45 percent by weight of the plasticizer.

The total paint composition to be sprayed comprises from about 20 percent to about 55 percent by weight of the plasticized acrylic polymer dispersion and about 45 percent to about 80 percent of the solvent thinner.

The final paint composition (acrylic polymer dispersion) is adapted to be modified by the incorporation of drying oils, waxes (e.g., hydrocarbon, chlorinated hydrocarbon, and ester types), pigments, fillers, dyes, as well as plasticizers and polymeric or resinous materials which are soluble in the hydrocarbon liquid vehicle, including fatty-acid modified shellac, gums, natural resins, waxes, asphalt, bitumen, coal tar, cumarone-indene resins, epoxidized fatty oils, epoxy resins, organic solvent-soluble alkylated methylolated aminoplast resins including the condensates of formaldehyde with urea, melamine, thiourea, benzoguanamine, ethylene urea, alkylated with an alcohol having two to six carbon atoms such as n-butanol. Among other materials that can be incorporated are the alkyds, organic solvent-soluble vinyl and acrylic resins with or without plasticizers, including plastisols obtained from polyvinyl chloride or copolymers of vinyl chloride and plasticizers therefor.

The novel mixture of materials to be polymerized in the above-described manner comprises:
a. a polymerizable monomer;
b. a polymerizable ethylenically unsaturated acid;
c. an imine;
d. dispersing liquid; and
e. a dispersion stabilizer.

The polymerizable monomer which is polymerized in the process of this invention may be any ethylenically unsaturated monomer such as methyl methacrylate, ethyl acrylate, styrene, butyl acrylate, 2-hydroxy ethyl acrylate and methacrylate, 2-hydroxypropyl acrylate and methacrylate, 2-ethyl hexyl acrylate and methacrylate, acrylonitrile, acrylamide, acrylic acid, methacrylic acid, vinyl toluene, and many others. A more complete description of these monomers may be found in U.S. Pat. No. 3,037,963. A particularly preferred ethylenically unsaturated monomer to be polymerized is methyl methacrylate.

The polymerizable ethylenically unsaturated carboxylic acid may be any acidic acrylic compound such as acrylic acid, methacrylic acid, crotonic acid, 3-butenoic acid, itaconic acid, and the like. This acid reacts with the imine component.

The imine, in turn, may be any imine-containing compound which will react with the carboxylic acid.

Any imine-containing compound which will react with a carboxylic acid may be used. Generally the imine-containing compounds are the alkylene imines and substituted alkylene imines. The preferred class of such imines are those of the formula:

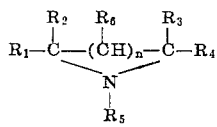

$$R_1-\underset{\underset{R_5}{\overset{|}{N}}}{\overset{\overset{R_2}{|}}{C}}-(\overset{\overset{R_6}{|}}{C}H)_n-\overset{\overset{R_3}{|}}{C}-R_4$$

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like, or aralkyl, such as benzyl, phenethyl or the like. $R_6$ in the above formula is hydrogen or a lower alkyl radical usually having not more than about six carbon atoms, and n is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimine (whether or not within the above formula) does not depend upon the particular nature of any of the substituents, but rather the imine linkage; thus, beneficial results are obtained with interpolymers modified by any of those compounds within the above class.

A number of specific examples of alkyleneimines within the class described are as follows:
Ethylenimine (aziridine)
1,2-propylenimine (2-methyl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl aziridine)
3-chloropropyl ethylenimine (2-(3-chloropropyl)-aziridine)
p-chlorophenyl ethylenimine (2-(4-chlorophenyl)-aziridine)
Methoxyethyl ethylenimine (2-(2-methoxyethyl)-aziridine)
Dodecyl aziridinyl formate (dodecyl 1-aziridinyl carboxylate)
Carbethoxyethyl ethylenimine (2-(2-carbethoxyethyl-aziridine)
N-ethyl ethylenimine (1-ethyl aziridine)
N-butyl ethylenimine (1-butyl aziridine)
N-(2-aminoethyl)ethylenimine (1-(2-aminoethyl)-aziridine)
N-(phenethyl)ethylenimine (1-(2-phenylethyl)-aziridine)
N-(2-hydroxyethyl)ethylenimine (1-(2-hydroxyethyl)-aziridine)
N-(cyanoethyl) ethylenimine (1-cyanoethyl aziridine)
N-phenyl ethylenimine (1-phenyl aziridine)
N-tolyl ethylenimine (1-(2-methylphenyl)aziridine)
N-(p-chlorophenyl)ethylenimine (1-(4-chlorophenyl)-aziridine)

Because of their availability and because they have been found to be among the most effective, the preferred imines are alkyleneimines and substituted alkyleneimines having two to four carbon atoms, and especially ethylenimine, 1,2-propylenimine, and N-hydroxyethyl ethylenimine.

The dispersing liquid is an aliphatic hydrocarbon solvent such as those which are discussed above. Examples of liquid aliphatic hydrocarbon solvents useful as dispersing liquids are pentane, hexane, heptane, octane, and the like.

The dispersion stabilizer used in this invention is a branched copolymer comprising two types of polymer components of which one segment is solvated by the aliphatic hydrocarbon solvent and not associated with polymerized particles of the polymerizable ethylenically unsaturated monomer and the second type is an anchor polymer of different polarity to the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reaction producing a polyester or polyether. Preferably the polyester reaction is a simple one involving a monohydroxylic monoscarboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-decanediol may be reacted with sebacic acid or its diacid chloride to form a component solvatable by aliphatic hydrocarbons.

The preferred polymeric segment (A) of the dispersion stabilizer is formed by reacting poly-12-hydroxy stearic acid with glycidyl methacrylate.

The second polymeric segment (B) of the dispersion stabilizer is of different polarity to the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) of which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids such as acrylic acid, methacrylic acid, 3-butenoic acid, crotonic acid, itaconic acid, and the like, which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually separated entities, the segment (A) being attached to the backbone of the graft copolymer and the segment (B) being carried in or on the backbone. However, in some cases the segments (A) and (B) may be attached one to the other. For example, segment (A) may be attached to segment (B) by ionized ionic linkages.

The imine component which reacts with the carboxylic acid component may be added before, during, or after the polymerization of the acrylic monomer. While often the imine reaction is carried out after the polymer has been produced, it has been found that some saving of time without any sacrifice in properties is achieved by carrying out the reaction with imine concurrently with the interpolymerization reaction. In this embodiment, the imine is added to the polymerization mixture at any point prior to the completion of the polymerization reaction. Preferably, the imine is added after the monomers, but before the polymerization is substantially advanced.

The polymerization reaction is otherwise carried out in conventional manner, utilizing heat and/or catalysts and varying solvents and techniques. Generally, a free-radical catalyst, such as cumene hydroperoxide, benzoyl peroxide or similar peroxygen compound, or a azo compound, is employed. When the polymerization reaction and the reaction with imine are conducted concurrently as described above, azo compounds, and especially alpha,alpha-azobis(isobutyronitrile), are preferred as the catalyst.

The dispersion preferably contains from about 1 percent to about 40 percent by weight of the dispersion stabilizer based on the weight of the ethylenically unsaturated monomer, from about 0.2 percent to about 6 percent by weight of the ethylenically unsaturated carboxylic acid based on the ethylenically unsaturated monomer, from about 0.2 percent to about 6 percent by weight of imine based on the ethylenically unsaturated monomer and the aliphatic hydrocarbon solvent preferably comprises from about 30 percent to about 70 percent by weight of the entire dispersion. The dispersion which yields coatings having the best adhesive properties and the best stability to thinning solvents are those dispersions containing about 6.6 percent by weight of the dispersion stabilizer based on the ethylenically unsaturated monomer, about 0.75 percent by weight of the carboxylic acid and about 0.75 percent of the imine, both based on the ethylenically unsaturated monomer and the entire dispersion containing about 45 percent by weight of the aliphatic hydrocarbon solvent.

When the polymerization is complete, the acrylic polymer dispersion may then be used as coatings for all types of substrates. Preferably the dispersion is thinned with thinning solvents and sprayed on to the substrate to be coated but the polymeric dispersion may be applied in any conventional manner such as dip coating, roll coating, etc.

The coating compositions described may be used as coatings for a variety of substrates such as textile fabrics, paper, paperboards, leather, wood, metals, ceramics, concrete, bricks, stone, plaster, vinyl materials, linoleum, asphalt tile, and asbestos products. They are especially useful as topcoats for automotive products. Automotive bodies spray-coated with these compositions have glossy coatings which are quite durable.

The following Examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE 1

An acrylic polymer dispersion was prepared in the following manner:

A container was charged with 612 grams of Napoleum 30 (an aliphatic hydrocarbon having a boiling point of 205°–234° F.), 306 grams of heptane, 306 grams of hexane, 64.8 grams of methyl methacrylate, 16.7 grams of a dispersion stabilizer prepared by reacting 50 parts of the reaction product of 9 parts of polyhydroxy stearic acid and 1 part of glycidyl methacrylate with 45 parts of methyl methacrylate and 5 parts of glycidyl methacrylate and reacting the product of that reaction with methacrylic acid, and 4.6 grams of azobis(isobutyronitrile). The mixture was heated at 86° C. for 20 minutes. A mixture of 1383 grams of methyl methacrylate, 11 grams of methacrylic acid, 288 grams of the same dispersion stabilizer, 3 grams of octyl mercaptan, and 4.6 grams of azobis(isobutyronitrile) were added dropwise over the next 3 hours at a temperature of 86° C. The mixture was refluxed for one-half hour at 86.5° C. and 6 cubic centimeters of 2-hydroxy ethyl ethylene imine were added. After refluxing at 87°C. for an additional one-half hour, 5 cubic centimeters of 2-hydroxyethyl ethylene imine were added, and the reaction was continued at 87° C. for 3 additional hours.

The above acrylic polymer dispersion was tested for its stability to large amounts of active solvent (Cellosolve acetate) and compared to the stability of a dispersion which was prepared in the same manner with exactly the same ingredients but with the exception that no imine was added.

The tests were conducted by reducing the dispersion to 52 percent solids with a non-active solvent (in this case, a hexane-heptane mixture) and adding a strong coalescing solvent (in this case - Cellosolve acetate) until the solids content is reduced to 40 percent, 37.5 percent, 35 percent, 32.5 percent, 30 percent, 27.5 percent, and 25 percent.

The dispersion of this example was found to be stable to this addition until the solids content was reduced to 25 percent at which point there was a slight increase in viscosity. Even at 25 percent solids content, the dispersion did not gel after storage of over 2 weeks at room temperature.

The dispersion without imine-modification exhibited a viscosity rise when reduced to only 30 percent solids content and gelled after 2 weeks' storage at room temperature when reduced to only 32.5 percent solids content.

EXAMPLE 2

An acrylic polymer dispersion was prepared in the following manner:

A container was charged with 612 grams of Napoleum 30, 306 grams of heptane, 306 grams of hexane, 64.8 grams of methyl methacrylate, 15.7 grams of a dispersion of polyhydroxy comprising 108.5 parts of the reaction product of polyhydroxy stearic acid and glycidyl methacrylate, 50 parts of methyl methacrylate, 5.6 parts of glycidyl methacrylate, 1.1 parts of methacrylic acid, 2.2 parts of azobis(isobutyronitrile), 10.4 parts of hydroquinone, 51 parts of N,N-dimethyl coconut amine, 137 parts of butyl acetate, and 40 parts of ethyl acetate, and 4.6 grams of azobis(isobutyronitrile) catalyst. The mixture was heated at 86° C. for one-half hour. A mixture of 1383 grams of methyl methacrylate, 11 grams of methacrylic acid, 271 grams of the dispersion stabilizer, 3 grams of octyl mercaptan, and 4.6 grams of azobis(isobutyronitrile) were added dropwise over the next 3 hours at a temperature of 86° C. The mixture was refluxed for a half hour at 86.5° C. and 6 cubic centimeters of 2-hydroxy ethyl ethylene imine were added. After refluxing at 87° C. for an additional three-quarters hour, 11 cubic centimeters of 2-hydroxy ethyl ethylene imine and 64 grams of isopropyl alcohol were added and the reaction was continued at 87° C. for 3 additional hours.

The above acrylic polymer dispersion was found to be stable when reduced to 25 percent solids content by the addition of Cellosolve acetate.

EXAMPLE 3

An acrylic polymer dispersion was prepared in the following manner:

A container was charged with 612 grams of Napoleum 30, 306 grams of heptane, 306 grams of hexane, 64.8 grams of methyl methacrylate, 15.7 grams of the dispersion stabilizer used in Example 2, and 4.6 grams of azobis(isobutyronitrile). The mixture was heated at 86° C. for one-half hour. A mixture of 1,383 grams of methyl methacrylate, 11 grams of methacrylic acid, 271 grams of the dispersion stabilizer, 3 grams of octyl mercaptan, 11 grams of 2-hydroxy ethyl ethylene imine, and 4.6 grams of azobis(isobutyronitrile) were added dropwise over the next 3½ hours at a temperature of 86° C. The mixture was refluxed for an additional 1½ hours at 86° C.

The above acrylic polymer dispersion was found to be stable, when diluted to 25 percent solids content by the addition of Cellosolve acetate.

According to the provisions of the patent statutes, there is described above the invention and what are now considered to be its best embodiments. However, within the scope of the appended claims, it is to be understood that the invention can be practiced otherwise than as specifically described.

We claim:

1. A dispersion of polymer particles in an aliphatic hydrocarbon liquid prepared from the composition comprising a. a polymerizable ethylenically unsaturated monomer;
   b. from about 0.2 percent to about 6 percent by weight of a polymerizable ethylenically unsaturated carboxylic acid based on the ethylenically unsaturated monomer,
   c. from about 0.2 percent to about 6 percent by weight, based on the ethylenically unsaturated monomer of an imine having the formula:

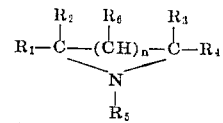

wherein $R_1$, $R_2$, $R_3$, $R_4$ and $R_5$ are each selected from the group consisting of hydrogen, alkyl, aryl, or aralkyl groups and $R_6$ is selected from the group consisting of hydrogen or alkyl having not more than about six carbon atoms and n is an integer from 0 to 1.
   d. from about 30 percent to about 70 percent by weight based on the entire dispersion of aliphatic hydrocarbon solvent having a boiling range of about 30° C. to about 300° C; and
   e. from about one percent to about 40 percent by weight based on the ethylenically unsaturated monomer of a dispersion stabilizer which is a branched copolymer containing two polymeric segments of which one segment is solvated by the aliphatic hydrocarbon solvent and the second segment is an anchor polymer of different polarity to the first segment and is relatively non-solvatable by the aliphatic hydrocarbon solvent and is capable of anchoring with the polymerized particles of the ethylenically unsaturated monomer, and said anchor polymer containing pendant groups which are copolymerizable with ethylenically unsaturated monomers.

2. The dispersion of claim 1 wherein compound (a) is methyl methacrylate.

3. The dispersion of claim 1 wherein compound (b) is methacrylic acid.

4. The dispersion of claim 1 wherein compound (c) is 2-hydroxy ethyl ethylene imine.

5. The dispersion of claim 1 wherein compound (d) is a blend of aliphatic hydrocarbon solvents.

6. A process for producing a dispersion of polymer in a dispersing liquid of aliphatic hydrocarbon having a boiling range of about 30° C. to about 300° C. in which the polymer is insoluble which comprises polymerizing at least one ethylenically unsaturated monomer in from about 30 percent to about 70 percent by weight based on the entire dispersion of said dispersing liquid in the presence of from about 0.2 percent to about 6 percent by weight based on the ethylenically unsaturated monomer of a polymerizable ethylenically unsaturated acid from about 0.2 percent to about 6 percent by weight based on the ethylenically unsaturated monomer of an imine having the formula:

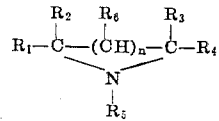

wherein $R_1$, $R_2$, $R_3$, $R_4$ and $R_5$ are each selected from the group consisting of hydrogen, alkyl, aryl, or aralkyl groups and $R_6$ is selected from the group consisting of hydrogen or alkyl having not more than about 6 carbon atoms and n is an integer from 0 to 1, and from about 1 percent to about 40 percent by weight based on the ethylenically unsaturated monomer of a dispersion stabilizer comprising a branched copolymer containing two polymeric segments of which one segment is solvated by the dispersing liquid and the second segment is an anchor polymer of different polarity to the first segment and is relatively non-solvated by the dispersing liquid and is capable of anchoring with the polymerized particles of the ethylenically unsaturated monomer, said anchor polymer containing pendant groups which are copolymerizable with ethylenically unsaturated monomers.

7. The method of claim 6 wherein the dispersed polymer formed is poly methyl methacrylate.

8. The method of claim 6 wherein the ethylenically unsaturated carboxylic acid is methacrylic acid.

9. The method of claim 6 wherein the imine is 2-hydroxy ethyl ethylene imine.

10. The method of claim 6 wherein the dispersion stabilizer is formed by graft copolymerizing (A) the reaction product of glycidyl methacrylate and poly-12-hydroxy stearic acid and (B) the reaction product of methyl methacrylate, glycidyl methacrylate and the copolymer product containing pendant epoxy groups is reacted with methacrylic acid.

* * * * *

UNITED STATES PATENT OFFICE
CERTIFICATE OF CORRECTION

Patent No. 3,666,710                    Dated May 30, 1972

Inventor(s) Joseph M. Makhlouf et al

It is certified that error appears in the above-identified patent and that said Letters Patent are hereby corrected as shown below:

Column 7, line 23, after "dispersion" add ---stabilizer---.

Column 7, line 23, delete "of" (second occurrence).

Column 7, line 24, delete "polyhydroxy".

Signed and sealed this 9th day of January 1973.

(SEAL)
Attest:

EDWARD M. FLETCHER, JR.              ROBERT GOTTSCHALK
Attesting Officer                     Commissioner of Patents